United States Patent [19]

Yamamoto et al.

[11] Patent Number: 4,837,118
[45] Date of Patent: Jun. 6, 1989

[54] MAGNETO-OPTICAL RECORDING MEDIUM

[75] Inventors: Ryoichi Yamamoto; Masaaki Nomura; Takashi Yamada; Akira Nahara, all of Odawara, Japan

[73] Assignee: Fuji Photo Film Co., Ltd., Kanagawa, Japan

[21] Appl. No.: 48,676

[22] Filed: May 11, 1987

[30] Foreign Application Priority Data

May 12, 1986 [JP] Japan ............... 61-108268

[51] Int. Cl.$^4$ ............................................. B32B 15/01
[52] U.S. Cl. .................................... 428/645; 428/649; 428/668; 428/672; 428/673; 428/675; 428/676; 428/694; 428/900; 428/928
[58] Field of Search ............... 428/694, 900, 928, 611, 428/678, 680, 611, 645, 649, 668, 672, 673, 675, 676, 680, 691; 365/122; 360/131, 134, 135; 369/13, 288

[56] References Cited

U.S. PATENT DOCUMENTS 4,414,650 11/1983 Ohta et al. ........................... 365/122
4,417,290 11/1983 Tanaka et al. ...................... 360/131
4,578,322 3/1986 Sawamura et al. ................. 428/694
4,670,356 6/1987 Sato et al. ........................... 428/693
4,675,767 6/1987 Osato et al. ........................ 360/131

FOREIGN PATENT DOCUMENTS 84358 5/1984 Japan .
201247 11/1984 Japan .
243842 12/1985 Japan .

Primary Examiner—George F. Lesmes
Assistant Examiner—James B. Monroe
Attorney, Agent, or Firm—Gerald J. Ferguson, Jr.

[57] ABSTRACT

A magneto-optical recording medium comprises a transparent substrate and a magneto-optical recording layer overlaid on the transparent substrate. The magneto-optical recording layer is formed by alternately overlaying a plurality of thin layers containing a rare earth metal-transition metal alloy for magneto-optical recording, and a plurality of thin layers containing at least one metal selected from the group consisting of gold, silver, lead, magnesium, copper, and iridium which are solid solution non-formable metals.

7 Claims, 2 Drawing Sheets

MAGNETO-OPTICAL RECORDING MEDIUM

BACKGROUND OF THE INVENTION

1. Field of the Invention

This invention relates to a magneto-optical recording medium such as a magneto-optical disk which is used for a large-capacity information file or the like. This invention particularly relates to an improvement of a magneto-optical recording layer of the magneto-optical recording medium.

2. Description of the Prior Art

Among optical recording media having various advantages, for example, the advantage that they can record information at a high density, have a large capacity, and need not be contacted with a head, magneto-optical recording media have attracted attention from the viewpoint of easy erasing and rerecording.

The magneto-optical recording medium is composed of a magnetic material as a recording medium, and records information based on changes in magnetization of the magnetic material. For example, an amorphous alloy composed of a combination of a rare earth metal (RE) such as Gd, Tb or Dy with a transition metal such as Fe, Co or Ni is used as the magnetic material. The magnetic material is used in a layer form as a recording layer.

A problem with the aforesaid magneto-optical recording medium is how to improve bit stability for the purpose of improving the C/N ratio in the course of magnetic recording and reproducing. It has heretofore been known that, in order to improve the bit stability, the coercive force should be increased by increasing the magnetic anisotropy of the magnetic material in the recording layer in the vertical direction.

Therefore, research has heretofore been undertaken to increase the coercive force of the magnetic material in the recording layer.

SUMMARY OF THE INVENTION

The primary object of the present invention is to provide a magneto-optical recording medium exhibiting a high coercive force of a magnetic material in a magneto-optical recording layer, and high bit stability.

Another object of the present invention is to provide a magneto-optical recording medium exhibiting a high C/N ratio in the course of magnetic recording and reproducing.

The present invention provides a magneto-optical recording medium comprising a transparent substrate and a magneto-optical recording layer overlaid on said transparent substrate, wherein said magneto-optical recording layer is formed by alternately overlaying a plurality of thin layers containing a rare earth metal-transition metal alloy for magneto-optical recording, and a plurality of thin layers containing at least one metal selected from the group consisting of gold (Au), silver (Ag), lead(Pb), magnesium (Mg), copper (Cu), and iridium (Ir) which are solid solution non-formable metals.

With the magneto-optical recording medium in accordance with the present invention, each of the thin layers containing at least one solid solution non-formable metal is disposed between adjacent magnetic layers containing a rare earth metal-transition metal alloy, and the thickness of each of the magnetic layers is adjusted to be small so that freely moving magnetic walls in the magnetic layers are intercepted by the thin layers containing the solid solution non-formable metal (i.e. the pinning of magnetization is achieved). Therefore, it is possible to improve the coercive force of the magnetic material. Also, it is possible to increase the magnetic anisotropy and to improve the bit stability, thereby to improve the C/N ratio in the course of magnetic recording and reproducing.

In the present invention, the rare earth metal-transition metal alloy may be selected from the group consisting of GdFe, TbFe, DyFe, GdTbFe, TbDyFe, TbFeCo, GdFeCo, GdTbCo, GdTbFeCo and other alloys.

By the term "solid solution non-formable metal" as used herein is meant a metal which does not form a solid solution and an intermetallic compound with Fe and/or Co. Specifically, Au does not form a solid solution and an intermetallic compound with Co. Also, Cu and Ir do not form a solid solution and an intermetallic compound with Fe. Ag, Pb and Mg do not form a solid solution and an intermetallic compound with Co and Fe. Therefore, Au, Cu, Ir, Ag, Pb and Mg come within the category of the solid solution non-formable metal as defined herein.

The thickness of each of the thin layers containing the rare earth metal-transition metal alloy should be adjusted to be such a value that the coercive force of the magnetic material can be improved by the presence of the thin layers containing the solid solution non-formable metal and the magnetic characteristics do not deteriorate. Thus the layer thickness of each of the thin layers containing the rare earth metal-transition metal alloy should preferably be adjusted to a value within the range of, for example, 50 Å to 200 Å.

The layer thickness of each of the thin layers containing the solid solution non-formable metal should be adjusted to be such a value that the coercive force of the magnetic material can be improved, the magnetic characteristics of the magnetic material do not deteriorate, and a decrease in transmittance with respect to recording and reproducing light is only of a practically acceptable level. Thus the layer thickness of each of the thin layers containing the solid solution non-formable metal should preferably be adjusted to a value within the range of, for example, 2 Å to 20 Å.

The layer thickness of the magneto-optical recording layer is equal to the sum of the thicknesses of the thin layers containing the rare earth metal-transition metal alloy and the thicknesses of the thin layers containing the solid solution non-formable metal and is adjusted to a value within the range of, for example, 100 Å to 5,000 Å.

DESCRIPTION OF THE PREFERRED EMBODIMENTS

The present invention will hereinbelow be described in further detail with reference to the accompanying drawings.

Figure 1:
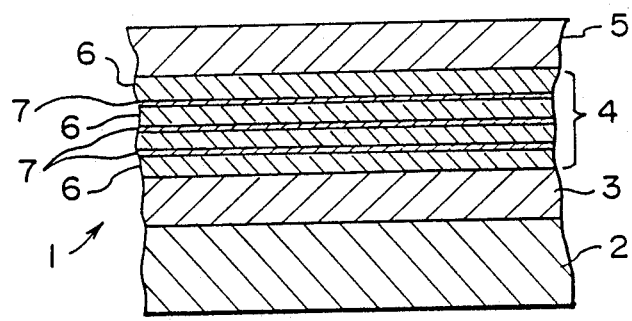
FIG. 1 is a sectional view showing the layer configuration of an embodiment of the magneto-optical recording medium in accordance with the present invention.

Referring to FIG. 1, a magneto-optical recording medium 1 comprises a transparent substrate 2, and a first protective layer 3, a magneto-optical recording layer 4, and a second protective layer 5 which are overlaid in this order on the transparent substrate 2. The magneto-optical recording layer 4 is formed by alternately overlaying a plurality of magnetic layers 6, 6, . . . and a plurality of solid solution non-formable metal layers 7, 7, . . .

The transparent substrate 2 is constituted by glass, or a transparent plastic material such as PC, PMMA, or an epoxy resin, and formed to a thickness of approximately 1 mm.

The first protective layer 3 and the second protective layer 5 are constituted by a dielectric material such as SiO, SiO$_2$, Si$_3$N$_4$, or ZnS, and formed to a thickness within the range of approximately 500 Å to approximately 3,000 Å. The protective layers 3 and 5 prevent the magneto-optical recording layer 4 from directly contacting the ambient air, thereby to prevent oxidation of the magnetic material in the magneto-optical recording layer 4.

The magneto-optical recording layer 4 is formed to a thickness of approximately 1,000 Å by alternately overlaying approximately ten magnetic layers 6, 6, . . . and approximately ten solid solution non-formable metal layers 7, 7, . . .

Each of the magnetic layers 6, 6, . . . contains a rare earth metal-transition metal alloy such as TbFeCo, and is formed to a thickness of, for example, approximately 100 Å.

Each of the solid solution non-formable metal layers 7, 7, . . . contains a solid solution non-formable metal, and is formed to a thickness of, for example, approximately 10 Å. The solid solution non-formable metal does not form a solid solution and an intermetallic compound with Fe and/or Co, and is at least one of Au, Ag, Cu, Ir, Mg and Pb.

The magneto-optical recording layer 4 is formed by carrying out sputtering onto the transparent substrate 2 by use of a main target containing the rare earth metal-transition metal alloy and a subsidiary target containing the solid solution non-formable metal. At this time, a shutter is disposed between the transparent substrate 2 and the main target and the subsidiary target, or only between the transparent substrate 2 and the subsidiary target, and opening and closing of the shutter are controlled so that the magnetic layers 6, 6, . . . and the solid solution non-formable metal layers 7, 7, . . . are alternately overlaid to form the magneto-optical recording layer 4.

Figure 2A:
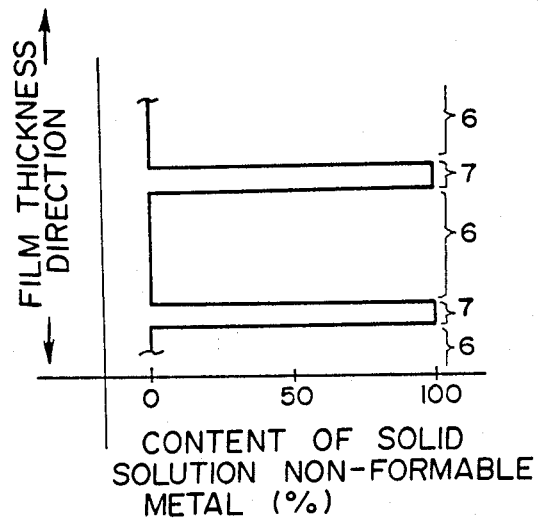
FIGS. 2A, 2B and 2C are graphs showing examples of content ratios of a solid solution non-formable metal in the film thickness direction of the magneto-optical recording layer as shown in FIG. 1.
Figure 2B:
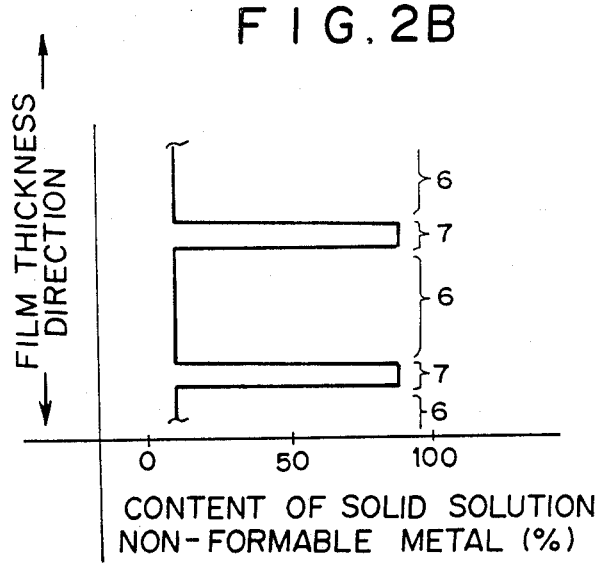
Figure 2C:
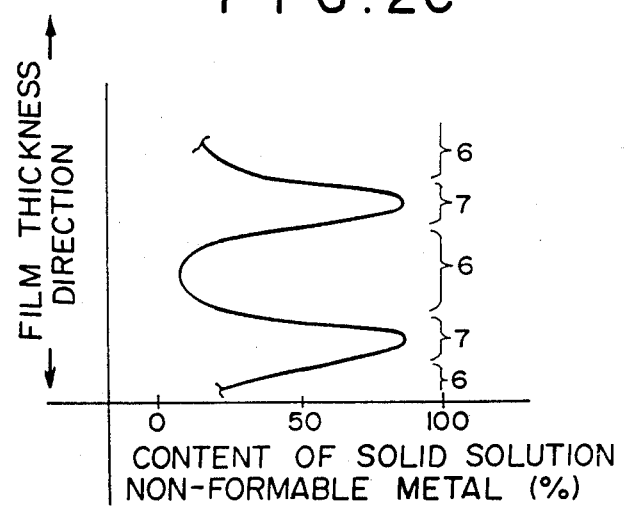

For example, as shown in FIG. 2A, the magnetic layers 6, 6, . . . and the solid solution non-formable metal layers 7, 7, . . . should preferably be clearly bounded by each other in the magneto-optical recording layer 4 formed in the manner as mentioned above. Also, as shown in FIG. 2A, the content ratio of the solid solution non-formable metal in the magnetic layers 6, 6, . . . should preferably be 0%, and the content ratio of the solid solution non-formable metal in the solid solution non-formable metal layers 7, 7, . . . should preferably be 100%. However, even though the content ratios of the solid solution non-formable metal in the magnetic layers 6, 6, . . . and in the solid solution non-formable metal layers 7, 7, . . . are respectively not 0% and 100% as shown in FIG. 2B, i.e. even though the magnetic layers 6, 6, . . . contain a small amount of the solid solution non-formable metal and the solid solution non-formable metal layers 7, 7, . . . are not entirely constituted by the solid solution non-formable metal, it is possible to obtain the effect of improving the coercive force of the magnetic material to approximately the same extent as in the case of FIG. 2A. Nearly the same effect can be obtained also when, as shown in FIG. 2C, the magnetic layers 6, 6, . . . and the solid solution non-formable metal layers 7, 7, . . . are not clearly bounded by each other in the magneto-optical recording layer 4, and the content ratio of the solid solution non-formable metal changes continuously.

With the magneto-optical recording medium formed in accordance with the aforesaid embodiment, it is possible to increase the magnetic anisotropy and the coercive force to approximately 1.5 to 2.0 times the values obtainable with the conventional magneto-optical recording medium.

In the aforesaid embodiment, the magneto-optical recording layer 4 is formed by opening and closing the shutter disposed between the transparent substrate 2 and the main target and the subsidiary target, or only between the transparent substrate 2 and the subsidiary target. However, the method of forming the magneto-optical recording layer 4 is not limited to the aforesaid one, and any other method may be used for this purpose. For example, the magneto-optical recording layer 4 may be formed onto the rotating the transparent substrate 2 by carrying out dual simultaneous sputtering or dual simultaneous evaporation onto the rotating transparent substrate 2.

Also, as the thin layers for improving the coercive force of the magnetic material in the magnetic layers, besides the thin layers containing the aforesaid solid solution non-formable metal, layers containing gas (for example, Ar, N$_2$, or H$_2$) other than halogen gas may be used. In the case where the gas-containing layers are to be formed, the gas may be introduced into a vacuum chamber each time the formation of the magnetic layers is interrupted.

The layer thicknesses in the magneto-optical recording medium of the present invention are not limited to the aforesaid ranges.

We claim:

1. A magneto-optical recording medium comprising a transparent substrate and a magneto-optical recording layer overlaid on said transparent substrate wherein said magneto-optical recording layer is formed by alternately overlaying a plurality of thin layers containing a rare earth metal transition metal alloy, and a plurality of thin layers containing at least one solid solution non-formable metal selected from the group consisting of gold, silver, lead, magnesium, copper and iridium.

2. A magneto-optical recording medium as defined in claim 1 wherein each of said thin alternating overlying layers containing a rare earth metal-transition metal alloy has a layer thickness within the range of 50 Å to 200 Å.

3. A magneto-optical recording medium as defined in claim 1 wherein each of said thin alternating overlying layers containing at least one metal selected from the group consisting of gold, silver, lead, magnesium, copper, and iridium has a layer thickness within the range of 2 Å to 20 Å.

4. A magneto-optical recording medium as defined in claim 1 wherein said magneto-optical recording layer has a layer thickness within the range of 100 Å to 5,000 Å.

5. A magneto-optical recording medium as defined in claim 1 wherein said thin alternating overlying layers containing a rare earth metal-transition metal alloy and said thin alternating overlying layers containing at least one metal selected from the group consisting of gold, silver, lead, magnesium, copper, and iridium are clearly bounded by each other in said magneto-optical recording layer.

6. A magneto-optical recording medium comprising a transparent substrate and a magneto-optical recording layer overlaid on said transparent substrate, wherein said magneto-optical recording layer is formed by alternately overlaying a plurality of thin layers containing a rare earth metal-transition metal alloy, and a plurality of thin layers containing at least one metal selected from the group consisting of gold, silver, lead, magnesium, copper and iridium, wherein the content ratio of said at least one metal selected from the group consisting of gold, silver, lead, magnesium, copper, and iridium in said thin layers containing a rare earth metal-transition metal alloy is 0%, and the content ratio of said at least one metal selected from said group in said thin layers containing at least one metal selected from the group consisting of gold, silver, lead, magnesium, copper, and iridium is 100%.

7. A magneto-optical recording medium as claimed in claim 1, wherein said thin alternating layers have respective thicknesses such that freely moving magnetic walls are intercepted, whereby magnetic coercive force is increased.

* * * * *